(12) United States Patent
Solis Herrera (10) Patent No.: US 10,752,525 B2
(45) Date of Patent: Aug. 25, 2020

(54) USES OF MELANIN IN WATER (71) Applicant: Arturo Solis Herrera, Aguascalientes (MX)

(72) Inventor: Arturo Solis Herrera, Aguascalientes (MX)

(*) Notice: Subject to any disclaimer, the term of this patent is extended or adjusted under 35 U.S.C. 154(b) by 207 days.

(21) Appl. No.: 15/504,831

(22) PCT Filed: Aug. 12, 2015

(86) PCT No.: PCT/IB2015/001360
§ 371 (c)(1),
(2) Date: Feb. 17, 2017

(87) PCT Pub. No.: WO2016/027143
PCT Pub. Date: Feb. 25, 2016

(65) Prior Publication Data
US 2018/0222779 A1 Aug. 9, 2018

Related U.S. Application Data

(60) Provisional application No. 62/039,683, filed on Aug. 20, 2014.

(51) Int. Cl.
*C02F 1/00* (2006.01)
*C02F 1/30* (2006.01)
(Continued)

(52) U.S. Cl.
CPC ............... *C02F 1/66* (2013.01); *C02F 1/005* (2013.01); *C02F 1/68* (2013.01); *C02F 1/70* (2013.01);
(Continued)

(58) Field of Classification Search
CPC .... C02F 1/005; C02F 1/30; C02F 1/66; C02F 1/68; C02F 1/70; C02F 1/727;
(Continued)

(56) References Cited

U.S. PATENT DOCUMENTS

| 4,719,144 A | 1/1988 | Kamat |
| 4,908,114 A | 3/1990 | Ayers |

(Continued)

FOREIGN PATENT DOCUMENTS

| CN | 101228297 A | 7/2008 |
| CN | 103638929 A | 3/2014 |

(Continued)

OTHER PUBLICATIONS

Haywood et al., "Protein, Lipid, and DNA radicals to measure skin UVA damage and modulation by melanin," Free Radical Biology & Medicine (2008), pp. 990-1000. (Year: 2008).*

(Continued)

*Primary Examiner* — Lucas A Stelling
(74) *Attorney, Agent, or Firm* — Panitch Schwarze Belisario & Nadel LLP (57) ABSTRACT

Methods for reducing and regulating the acidification of water are provided. The method for reducing the acidification of water includes contacting at least one melanin material with the water and catalyzing a reaction between the water, $CO_2$ and/or bicarbonate that produces glucose and increases pH of the water. The acidification of water is regulated by removing the at least one melanin material from the water once a desired pH of the water has been attained. The methods for reducing and regulating the acidification of water are particularly suited for the treatment of seawater that has been acidified by naturally occurring or artificially initiated reactions that increase free hydrogen ions in water, for example absorption of atmospheric carbon dioxide.

15 Claims, 2 Drawing Sheets

(51) Int. Cl.
| | |
|---|---|
| C02F 1/66 | (2006.01) |
| C02F 1/68 | (2006.01) |
| C02F 1/70 | (2006.01) |
| C02F 1/72 | (2006.01) |
| C09B 63/00 | (2006.01) |
| C25B 1/00 | (2006.01) |
| C25B 3/04 | (2006.01) |
| C02F 103/08 | (2006.01) |

(52) U.S. Cl.
CPC ............. *C02F 1/727* (2013.01); *C09B 63/00* (2013.01); *C25B 1/003* (2013.01); *C25B 3/04* (2013.01); *C02F 1/30* (2013.01); *C02F 2103/08* (2013.01); *C02F 2305/10* (2013.01); *Y02E 60/368* (2013.01)

(58) Field of Classification Search
CPC .. C02F 2103/08; C02F 2305/10; C09B 63/00; C25B 1/003; C25B 3/04; Y02E 60/368
See application file for complete search history.

(56) References Cited

U.S. PATENT DOCUMENTS

| | | | |
|---|---|---|---|
| 5,380,359 A | 1/1995 | Honda et al. | |
| 2005/0058618 A1 | 3/2005 | Evans et al. | |
| 2011/0244345 A1* | 10/2011 | Solis Herrera | C25B 1/003 429/422 |
| 2012/0220025 A1 | 8/2012 | Gellett et al. | |
| 2013/0288144 A1 | 10/2013 | Solis Herrera | |

FOREIGN PATENT DOCUMENTS

| | | |
|---|---|---|
| CN | 103896699 A | 7/2014 |
| JP | 4909346 B2 | 4/2012 |
| WO | 2007142501 A1 | 12/2007 |
| WO | 2013022348 A1 | 2/2013 |
| WO | 2014140740 A2 | 9/2014 |

OTHER PUBLICATIONS

Herrera, et al., "Human Photosynthesis and Alzheimer's Disease," Pharmaceutica Analytica Acta, S15, (2012), pp. 1-8. (Year: 2012).*
Office Action dated Jan. 10, 2018 in AU Application No. 2015304920.
Office Action dated Feb. 14, 2018 in CA Application No. 2958547.
Supplemental Search Report dated Feb. 16, 2018 in EP Application No. 15833113.2 (Partial).
Extended European Search Report dated May 3, 2018 in EP Application No. 15833113.2.
Hong et al., "Insight into the Binding of Divalent Cations to Sepia Eumelanin from IR Absorption Spectroscopy," Photochemistry and Photobiology, vol. 82, pp. 1265-1269 (2006).
Meredith et al., "Radiative Relaxation Quantum Yields for Synthetic Eumelanin," Photochemistry and Photobiology, vol. 79, No. 2, pp. 211-216 (2004).

Int'l Search Report dated Feb. 2, 2016 in Int'l Application No. PCT/IB2015/001360.
Dadachova et al, "Ionizing Radiation: How Fungi Cope, Adapt, and Exploit with the help of Melanin," Current Opinions in Microbiology, vol. 11, No. 6, pp. 525-531 (Dec. 2008).
Int'l Preliminary Report on Patentability dated Feb. 21, 2017 in Int'l Application No. PCT/IB2015/001360.
Written Opinion dated Feb. 2, 2016 in Int'l Application No. PCT/IB2015/001360.
Office Action dated Nov. 15, 2018 in CA Application No. 2958547.
Office Action dated Oct. 12, 2018 in AU Application No. 2015304920.
Office Action dated Oct. 30, 2018 in IN Application No. 201737005587.
Kenichi et al., "Is the Fixation of Carbon Dioxide Necessary?," Carbon Dioxide Immobilization, vol. 54, No. 1, pp. 95-98 (2002).
Office Action dated Feb. 26, 2019 in EP Application No. 15833113. 2.
Office Action dated Mar. 5, 2019 in JP Application No. 2016521643.
Office Action dated Jul. 9, 2019 in CA Application No. 2958547.
Office Action dated Sep. 9, 2019 in AU Application No. 2019200108.
Office Action dated Sep. 30, 2019 in CN Application No. 201580044476. 8.
Office Action dated Jan. 21, 2020 in Brazilian Application No. 112017003123-0 (Informal Translation).
Hatanaka, et al., "Is the Fixation of Carbon Dioxide Necessary?", Carbon dioxide fixation, Production research, vol. 54, No. 1 and 2, pp. 95-98 (2002).
Office Action dated Nov. 26, 2019 in JP Application No. 2016521643.
"BAT GEN" as evidenced by http://www.mexiconewsnetwork.com/news/bat-gen/ (Dated Jan. 13, 2015), https://chemistry.stackexchange.com/questions/24500/does-the-bat-genclaim-to-produce-more-energy-than-it-uses (as viewed Feb. 2, 2015) and https://www.youtube.com/watch?v=1Ab2jkN5X6c (Jun. 15, 2011); Retrieved on Jun. 12, 2020.
Kogej et al, "Evidence for 1,8-dihydroxynaphthalene melanin in three halophilic black yeasts grown under saline and non-saline conditions," FEMS Microbiology Letters, vol. 232, pp. 203-209 (2004).
McVean, A.—"Is Carbonated Water Bad for Your Teeth?" (https://www.mcgill.ca/oss/article/health-and-nutrition-quackery/carbonated-water-badyour-teeth); Retrieved on Jun. 12, 2020.
Mostert et al., "Role of semiconductivity and ion transport in the electrical conduction of melanin," PNAS, vol. 109, No. 23, pp. 8943-8947 (2012).
Office Action dated May 14, 2020 in CA Application No. 2958547.
Office Action dated Jun. 2, 2020 in JP Application No. 2019104332.
Office Action dated Jun. 5, 2020 in NZ Application No. 729159.
Office Action dated Apr. 9, 2020 in AU Appiication No. 2019200108.
Ji, Xiang, "New technologies for biomass energy and waste utilization," Jilin University Press, pp. 67-69 (2012).
Office Action dated Jun. 15, 2020 in CN Application No. 201580044476. 8.
Qiu, Weiran, "Proceedings of Research and Development of Nucieic Acid Products," East China University of Science and Technology Press, p. 13 (2003).

* cited by examiner

USES OF MELANIN IN WATER

CROSS-REFERENCE TO RELATED APPLICATION

This application is a Section 371 of International Application No. PCT/IB2015/001360, filed Aug. 12, 2015, which was published in the English language on Feb. 25, 2016, under International Publication No. WO 2016/027143 A1, and which claims priority to U.S. Patent Application No. 62/039,683, filed Aug. 20, 2014, the disclosures of both of which are incorporated herein by reference in their entireties.

BACKGROUND OF THE INVENTION

Embodiments of the present invention relate to uses of melanin in water. One such use includes methods for reducing and regulating the acidification of water. In particular, one embodiment of the present invention relates to a method for reducing the acidification of water, particularly seawater, by contacting the water with at least one melanin material in order to catalyze a reaction between water, carbon dioxide ($CO_2$) and/or bicarbonate in order to produce glucose, sucrose, or other organic compounds which increases the pH of the water and reduces the acidification of the water. In another aspect, the invention allows for maintaining the pH of the water at a desired level based on the surrounding conditions simply by keeping the melanin material in contact with the water or removing it therefrom. In another aspect, an embodiment of the present invention relates to the synthesis of amino acids and complex organic molecules arising from $CO_2$ or glucose, sucrose or the other organic compounds.

The rise of atmospheric $CO_2$, generated primarily from human fossil fuel combustion, has induced a significant decrease in the pH of ocean water, commonly referred to as ocean or seawater acidification. More particularly, ocean acidification occurs because atmospheric $CO_2$ gas is absorbed by and dissolved in seawater and causes a series of chemical reactions that ultimately decreases pH in ocean water. Specifically, once atmospheric $CO_2$ is dissolved in water, ocean carbonate chemistry is governed by the following series of chemical reactions:

$$CO_2 \text{ (atmos)} \leftrightarrow CO_2 \text{ (aq)} + H_2O \leftrightarrow H_2CO_3 \leftrightarrow H^+ + HCO_3^- \leftrightarrow 2H^+ + CO_3^{2-}$$

Air-sea gas interchange equilibrates surface water $CO_2$ to atmospheric levels of $CO_2$. Aqueous $CO_2$ gas reacts with water to form carbonic acid ($H_2CO_3$), which can then be dissociated by losing hydrogen ions to form bicarbonate ($HCO_3^-$) and carbonate ions ($CO_3^{2-}$). As a result, with increasing atmospheric $CO_2$, aqueous $CO_2$, bicarbonate, and hydrogen ion concentrations tend to increase, while pH and carbonate ion concentration tend to decrease. Ocean uptake of $CO_2$ may be responsible for alleviating nearly a third of anthropogenic $CO_2$ (i.e., $CO_2$ generated by human activity) which is released to the atmosphere. In other words, rising levels of atmospheric $CO_2$ are tempered by ocean uptake of $CO_2$, a phenomenon which is well documented in field data. To understand the changing chemistry of the oceans and the process of ocean acidification on marine ecosystems, researchers have been studying how $CO_2$ emissions affect the ocean ecosystem for more than three decades, and continue to monitor ocean acidification in the world's oceans.

Ocean acidification has been found to alter seawater chemical speciation and bio-geo-chemical cycles of many elements and compounds. Photosynthetic algae and sea grasses may actually benefit from higher $CO_2$ conditions in the ocean. However, multiple studies have revealed concerns that establish ocean acidification as a threat to marine wildlife. Acidic environments have been shown to have a negative effect on some calcifying species, including oysters, clams, sea urchins, shallow water corals, deep sea corals, and calcareous plankton. One well-known effect is the lowering of calcium carbonate saturation states, which impacts a variety of shell-forming marine organisms, ranging from plankton to benthic mollusks, echinoderms, and corals. Many calcifying species exhibit reduced calcification and growth rates in laboratory experiments under high-$CO_2$ conditions.

Since the beginning of the industrial revolution, the pH of the ocean water surface has fallen by 0.1 pH units due to ocean acidification, representing an approximately 30% increase in acidity of seawater. Future predictions indicate that the oceans will continue to absorb $CO_2$ at accelerated rates and become even more acidic, unless measures are taken to curb $CO_2$ emissions in the atmosphere.

Thus far, the primary ocean acidification management and mitigation actions proposed have focused on reducing anthropogenic $CO_2$ emissions to stabilize air and ocean $CO_2$ concentrations, and maximizing marine wildlife resilience and adaptation to elevated $CO_2$ concentrations using conventional marine management practices, such as pollution and overfishing reduction. However, stabilization of atmospheric $CO_2$ below harmful levels cannot currently be achieved. Also, conventional, passive management practices have not been effective against the impacts of rising $CO_2$ levels. Some alternative physical, biological, chemical, and hybrid conservation methods have also been proposed, but evaluation of the potential effectiveness, cost, safety, and scale of application of such methods has yet to be seriously undertaken.

Further, a variety of schemes have been proposed wherein seawater $CO_2$ acidity could be neutralized through the addition of a base carbonate or silicate minerals and derivatives to the seawater. However, while such chemical methods are commonly used in saltwater aquaria to maintain coral and shellfish health, the potential safety and cost effectiveness of such approaches in addressing local to global ocean acidification have yet to be fully researched.

Accordingly, it would be desirable to provide a process and system for reducing and regulating the pH of seawater to curb ocean acidification and the proven negative impacts thereof.

It would also be desirable to generate organic compounds, such as amino acids and lipids, from the glucose or $CO_2$. As well known to those of ordinary skill in the art, living creatures require, for proper nutrition, a variety of organic compounds, including amino acids, lipids, and others which can be obtained from plants and meat. Conventionally, to obtain such edible molecules, it is necessary to sow and harvest plants or obtain these edible organic compounds from farm animals, which require large harvests, large animal farms, massive use of insecticides to protect crops, fertilizers, herbicides, etc., and large amounts of water Accordingly, it would be desirable to provide a process and system for generating organic compounds, such as amino acids, lipids and the like, from the glucose or $CO_2$ associated with the reduction and regulation of the pH of seawater.

BRIEF SUMMARY OF THE INVENTION

One embodiment of the present invention relates to a method for reducing the acidification of water. The method generally comprises contacting at least one melanin material with water in order to catalyze the complex chemical reactions that occur within seawater molecules and affect, to some extent, the pH of the seawater. In particular, contacting at least one melanin material with water catalyzes a reaction between water, $CO_2$ and/or bicarbonate due to the free chemical energy emanating from melanin. Such reactions produce compounds, such as glucose, sucrose, pyruvate and the like, which are compatible with carbohydrates, and, in turn, increase the pH of the water. In another aspect, the present invention allows for modulating the change in pH and glucose levels in a body of water by either keeping the melanin material in contact with the water body or removing it therefrom, as necessary, to maintain a desired pH level.

The methods for reducing and regulating the acidification of water are especially relevant to the treatment of seawater that has been acidified by naturally occurring or artificially initiated reactions that increase free hydrogen ions in water. One example of such a reaction is the absorption of atmospheric $CO_2$ and the resulting ocean acidification process, as described above.

According to a preferred embodiment of the invention, the at least one melanin material is embedded in a construct of at least one inert material. According to another preferred embodiment of the invention, the at least one melanin material is selected from natural melanin or synthetic melanin.

More particularly, embodiments of the invention relate to methods for modulating the pH levels of water bodies, such as fresh water, ocean water, and even sewage water. More specifically, the invention relates to a method of reducing the acidification or promoting the alkalization, or neutralization of the acid-base balance, of water bodies using melanin, its precursors, derivatives or analogues, impregnated on an inert material which will allow the passage of only water. The intrinsic property of melanin to dissociate and reform the water molecule and convert light energy into chemical free energy produces changes in the acid-base balance of water that modify water pH closer to neutrality. Therefore, if the water to be treated is acidic, contact with the melanin material causes the pH of the water to tend toward alkalinity. If, however, the water to be treated is alkaline, contact with the melanin material causes the pH of the water to tend toward a more neutral pH of approximately 7.0. The type of chemical free energy emanating from melanin can replicate chemical reactions observed in nature, but which, until now, have not been possible to artificially reproduce, such as the transformation of $CO_2$ dissolved in water to glucose, or other compounds that spontaneously rarely would occur. The free chemical energy emanated by melanin tends to decrease the entropy of the surrounding environment which, in turn, promotes life. Melanin brings about this decreases in entropy in a unique way, namely by the dissociation and re-formation of the water molecule.

BRIEF DESCRIPTION OF SEVERAL VIEWS OF THE DRAWINGS

The foregoing summary, as well as the following detailed description of the invention, will be better understood when read in conjunction with the accompanying drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

All patents and publications referred to herein are incorporated by reference. Unless otherwise defined, all technical and scientific terms used herein have the same meaning as commonly understood to one of ordinary skill in the art to which this invention pertains. Otherwise, certain terms used herein have the meanings as set forth in the specification.

It must be noted that as used herein and in the appended claims, the singular forms "a," "an," and "the" include plural references unless the context clearly dictates otherwise.

As used herein, the term "melanin material" refers to melanin, melanin precursors, melanin derivatives, melanin analogs, and melanin variants including natural and synthetic melanin, eumelanin, pheomelanin, neuromelanin, polyhydroxyindole, alomelanin, humic acid, fulerens, graphite, polyindolequinones, acetylene black, pyrrole black, indole black, benzence black, thiophene black, aniline black, polyquinones in hydrated form, sepiomelanins, dopa black, dopamine black, adrenalin black, catechol black, 4-amine catechol black, in simple linear chain aliphatics or aromatics; or their precursors as phenols, aminophenols, or diphenols, indole polyphenols, quinones, semiquinones or hydroquinones, L-tyrosine, L-dopamine, morpholine, ortho-benzoquinone, dimorpholine, porphyrin black, pterin black, and ommochrome black.

As used herein, the term "inert material," when used in reference to a material for embedding at least one melanin material, refers to any material that is compatible with melanin but will not chemically react with melanin. Preferably, the inert material is a material that does not dissolve in water. Examples of inert materials are silicon, silica, calcium, aluminum and polyethylene.

As used herein, the term "seawater," when used with reference to water, refers to water in any body, particularly in a sea or ocean, or any water originating from a sea or ocean. The sea or ocean may be naturally-occurring or man-made.

As used herein, the term "acidification," when used with reference to water, refers to changes in the acid-base balance of water which ultimately results in the increase of free hydrogen ions in water (i.e., a decrease in pH). The increase of free hydrogen ions in water may be the result of a naturally-occurring or artificially initiated reaction, such as the absorption of atmospheric $CO_2$ by the water.

In one embodiment, the invention relates to an electrochemical system and method for restoring the neutrality of the acid-base balance of water and thereby for reducing the acidification of water containing $CO_2$ gas, bicarbonate, and other carbonate derivatives dissolved therein. The acidification reduction method comprises contacting at least one melanin material with the $CO_2$-enriched water. More particularly, only one or alternatively a plurality of melanin materials may be utilized in the method of the invention. In one embodiment, the contact between the water and the melanin material catalyzes a reaction between water, $CO_2$ and/or bicarbonate that produces organic compounds, such as glucose, which restore the acid-base balance of the water by increasing the pH of the water. Other organic compounds, such as sucrose, pyruvate and amino acids, may be produced by similarly catalyzed reactions, depending on the molecules that are present in the body of water to be treated. The production of glucose ($C_6H_{12}O_6$) according to a reaction between water and $CO_2$ can be represented by the following chemical equation:

$$6CO_2 + 6H_2O \rightarrow C_6H_{12}O_6 + 6O_2$$

In the absence of the melanin material, the $CO_2$ and water would undergo the above-described series of reversible reactions, thereby producing unstable carbonate and carbonate derivatives which are ultimately converted to $CO_2$. The presence of the melanin material, however, and more particularly the energy emanating from the melanin material catalyzes the conversion of aqueous $CO_2$ into organic compounds, such as glucose, sucrose and the like. Such compounds are stable and will not readily dissociate, thereby limiting the formation of free hydrogen ions and carbonates and derivatives thereof. More particularly, the hydrogen ion concentration is decreased, in part, because glucose utilizes the hydrogen ions. A lower hydrogen ion concentration in the water results in reduced acidification (i.e., alkalization) of the water.

The aforementioned reaction, and more particularly, the above-described disassociation of water molecules in the presence of melanin, may begin in the range of picoseconds to nanoseconds starting from the initial contact with the melanin material. The time until a change in pH of the water is perceptible or measurable, reflecting a detectable change in the acid-base balance of the water, depends on various factors, such as the volume of water to be treated, the initial $CO_2$, bicarbonate, and glucose concentrations, and the volume of the melanin material used. In one embodiment, the effect of the melanin material on the water can be observed by a gradually increasing change in the color of the water.

When $CO_2$ dissolves in water, it exists in chemical equilibrium with the various carbonate forms ($H_2CO_3$, $HCO_3^-$, and $CO_3^{2-}$). The concentration of the various carbonate forms is much lower than the concentration of $CO_2$. However, the melanin material may catalyze additional reactions between $CO_2$, water and one or more of the various carbonate forms that produce glucose and release oxygen, as described above. Examples of these reactions are:

$$H_2CO_3 + 5CO_2 + 5H_2O \rightarrow C_6H_{12}O_6 + 6O_2$$

$$HCO_3^- H^+ + 5CO_2 + 5H_2O \rightarrow C_6H_{12}O_6 + 6O_2$$

$$H_2CO_3 + HCO_3^- + H^+ + 4CO_2 + 4H_2O \rightarrow C_6H_{12}O_6 + 6O_2$$

It will be understood that the water may originate from any source, such as, for example, tap water, bottled water, or natural water, such as rain water and seawater. In a preferred embodiment of the invention, the water is seawater (also referred to herein as ocean water). In one embodiment, the water is contained in a vessel. The vessel may be of any size and shape. Examples of appropriate vessels include, but are not limited to, a flask, a bucket, or a water reservoir. In another embodiment, the water is not contained, but rather free-flowing for contacting the melanin material. Examples of water that is not contained include, but are not limited to, water in a sea, ocean, lake, river, stream, creek and the like. Such free-flowing bodies of water may be naturally-occurring or man-made.

According to embodiments of the invention, the melanin material is selected from melanin, melanin precursors, melanin derivatives, melanin analogs, and melanin variants. In a preferred embodiment, the melanin material is selected from natural melanin and synthetic melanin. Melanin can be synthesized from amino acid precursors of melanin, such as L-tyrosine. However, melanin materials can be obtained by any method known in the art in view of the present disclosure, including chemically synthesizing melanin materials and isolating melanin materials from natural sources, such as plants and animals.

The melanin material may contact all or a portion of the water. In one embodiment, where the water is contained in a vessel, the melanin material is generally immersed in the center of the body of water, such that it is in contact with all of the water (i.e., the entire volume of contained water). In another embodiment, where the water is contained in a vessel, the melanin material is placed on the surface of the water, such that it is in contact with only a portion of the contained water, but not dissolved therein. In another embodiment, where the water is not contained (i.e., free-flowing), the melanin material may be either immersed under the surface of the water, such that it is in contact with the entire volume of water, or placed on the surface of the water, such that it is in contact with only a portion of the water.

Preferably, the melanin material does not directly contact the water in order to regulate the rate of dilution of the melanin material. In one embodiment, the melanin material is embedded in a construct of at least one inert material (hereinafter referred to as a "melanin form"), thereby preventing direct contact of the melanin molecule with the water and significantly decreasing the rate of dilution and degradation of the melanin molecule in the water. Thus, the melanin material can last several decades to perform the alkalization actions.

It will be understood that the melanin form may have any dimensions or shape. For example, the melanin form may be generally planar or flat and may be shaped as a cylinder, ellipse, pyramid, sphere, rectangle, cube, and the like. In a preferred embodiment, the dimensions and overall geometry of the melanin form conform with or are dependent upon the volume of the water to be treated.

In one embodiment, only a single melanin form is placed into contact with the water. In another embodiment, multiple melanin forms are contacted with the water for reducing the acidification thereof. It will be understood that the rate of reduction of acidification of the water depends upon a variety of factors, each of which may be adjusted as necessary to achieve the desired reduction in acidity. For example, the reduction in acidity can be controlled by varying the dimensions, shape and/or surface area of the melanin form; the number of melanin forms used; the amount of melanin material embedded in each form; the volume of water to be treated; the initial concentration of bicarbonate and $CO_2$ in the water to be treated; and the like. In one embodiment, the melanin form may be permanently kept in contact with the water, since melanin may carry out its function for hundreds of years.

In one embodiment, the melanin form is preferably 1% to 99% melanin material by volume, and more preferably 3% to 30% melanin material by volume. The amount of inert material in the melanin form is preferably from 1% to 99% by volume, and more preferably 50% to 85% by volume.

In one embodiment, a 1 cubic centimeter melanin form of 15% melanin material by volume is effective for treatment of 50 mL of water. However, it will be understood that the composition, overall volume/size, shape, and the like of the melanin form may vary depending on several factors, such as the characteristics (i.e., pollution levels, pressure, temperature, etc.) of the water to be treated, the amount of light to which the water to be treated is exposed, the depth at which the melanin form will be placed in the water to be treated, and the desired changes in pH levels and glucose concentration.

Figure 1:
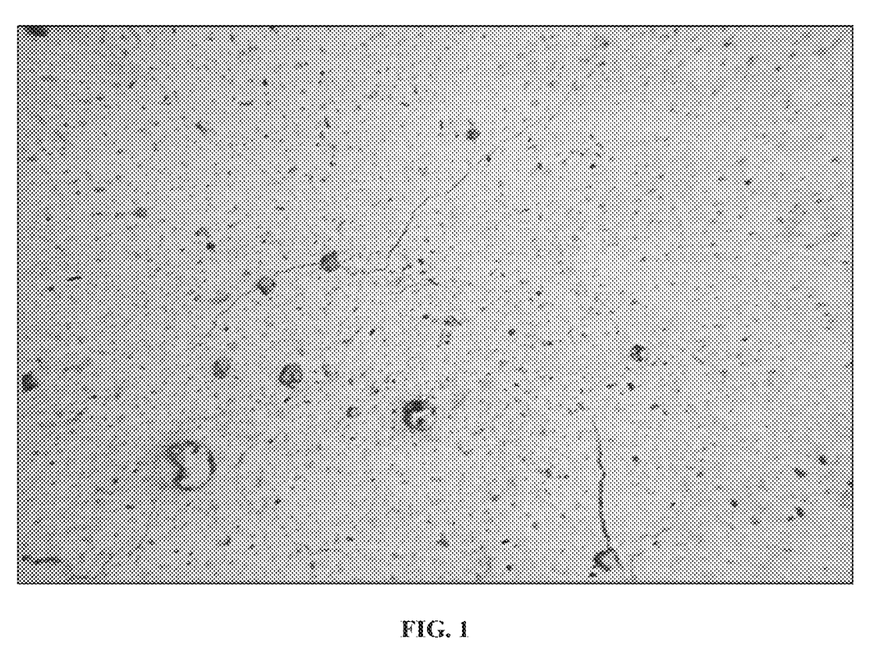
FIG. 1 is a photograph of the surface appearance of a melanin material embedded in a block of silica and calcium as seen through a microscope at a 40× magnification in accordance with an embodiment of the present invention.
Figure 2:
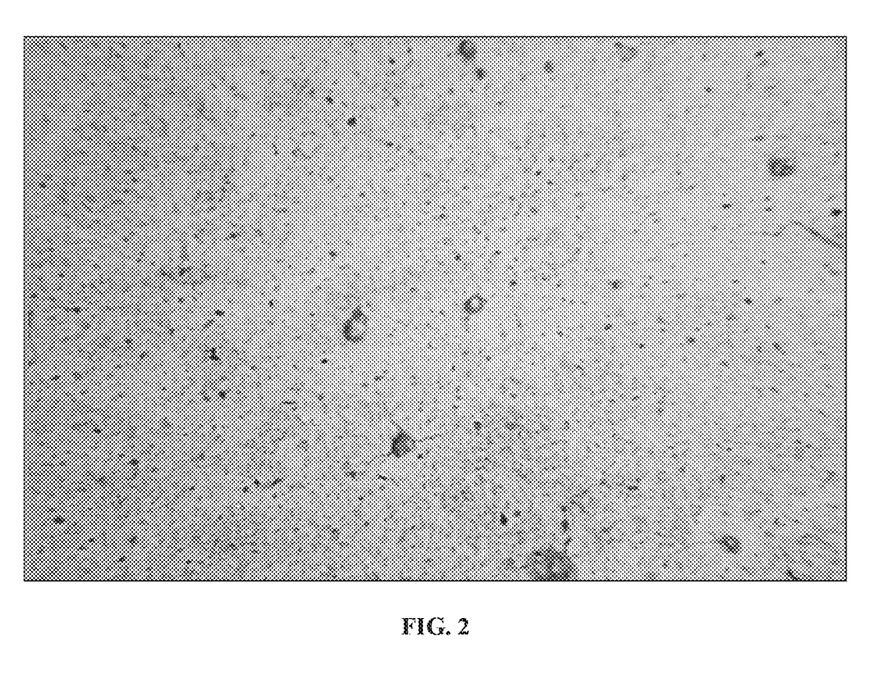
FIG. 2 is a photograph of the surface appearance of a melanin material embedded in a block of silica, aluminum and calcium as seen through a microscope at a 40× magnification in accordance with another embodiment of the present invention.

The inert material or materials may be any inert material that is compatible with the melanin material and does not affect the properties of the melanin material. Examples of such inert materials include, but are not limited to, aluminum, silicon, silica, calcium, gold, silver, polyethylene, glass and polycarbonate. As shown in FIGS. 1-2, in one embodiment, the melanin form comprises two or more inert materials, namely silica and calcium, and is in the shape of a block.

The at least one melanin material may be embedded in the inert material by any known or yet to be developed appropriate measures. In one embodiment, the melanin material is embedded in the inert material by adhesion. In another embodiment, the melanin material is embedded in the inert material by compression.

As an illustrative example, a melanin form in the shape of a block and including the melanin material embedded in silica may be made by combining an inert material (e.g., silica powder), purified water, and the melanin material in a cube-shaped container made of an inactive material. The components are mixed together and the mixture is allowed to cure or harden in the container, such that the hardened mixture takes on the shape of the container. Preferably, the melanin material is added at a concentration of 5 g/L of purified water. The preferred concentration of inert material in the melanin form is 50% to 95% by volume, and more preferably 50% to 85% by volume. It will be understood that the melanin form could have been made in any shape according to the same process simply by varying the shape of the container. It will also be understood that the silica powder can be substituted for any other appropriate inert material. It will also be understood that the concentration of melanin in the purified water and the concentration of inert material in the melanin form may vary as needed to meet the needs of a particular application.

The method for reducing acidification of water, by improving the acid-base balance of the water, and more particularly the contact between the water and the melanin form, can be performed at any temperature at which melanin is known to be stable, preferably between approximately −150° C. to 500° C. The boiling point of a 3% aqueous solution of melanin material is approximately 200° C. According to a preferred embodiment, the method for reducing acidification of water is more efficient if performed at a temperature ranging from −40° C. to 100° C., preferably 0° C. to 50° C., more preferably from 12° C. to 30° C., and most preferably at room temperature (approximately 25° C.). It will be understood, however, that the preferred temperature may vary with varying experimental conditions, such as pressure, amount of light, amount of water, pollutants in the water, and desired increase in pH.

In one embodiment, the present invention allows for an increase of between 0.1 and 1 pH unit of the treated water body. Preferably, the pH of the water body treated by the melanin form or forms is increased by 0.1 pH units to 0.6 pH units. It will be understood by those skilled in the art that the magnitude of change of the pH of the water body may vary depending on the proportion of melanin utilized with respect to the size of the water body to be treated.

Any method known in the art in view of the present disclosure may be used to determine the pH of the water, such as, for example, testing with pH paper or a pH meter. The pH of the water may increase by any amount, and any such increase in pH may be determined by comparing the pH of the water before being contacted with at least one melanin material and the pH of the water after contacting with the at least one melanin material, wherein the pH of the water after contacting with the at least one melanin material is greater than the pH of the water before contacting with the at least one melanin material.

In addition, any method known in the art in view of the present disclosure may be used to determine the organic compound concentration (e.g., glucose, sucrose, pyruvate and the like) in the water. For example, glucose concentration may be determined by testing with a glucose test strip or a spectrophotometer. Glucose concentration (or other organic compound concentration) may increase by any amount depending on the factors such as the previous physical-chemical conditions of the water, the nature of any solutes present in the water, and the like. Any such increase may be determined by comparing the concentration of the organic compound (e.g., glucose) in the water before contacting with at least one melanin material and the concentration of glucose in the water after contacting with the melanin material, wherein the glucose concentration of the water after contacting with the melanin material is greater than the glucose concentration of the water before contacting with the melanin material. Any such increase in glucose concentration is significant because the reaction between $CO_2$ and water that forms glucose is not spontaneous. Thus, the increase in glucose concentration may be a measure of the reaction catalysis by the melanin material. While the above discussion is directed to the formation of glucose, it will be understood that other organic compounds, such as such as sucrose or pyruvate, may be formed and similar methods may be used to determine the concentration of such organic compounds in the water.

Additionally, in the unlikely event that the melanin material is harmful in a marine environment, the melanin material may be removed. However, it will be understood that melanin is easily degraded by eukaryotic or prokaryotic cells. Thus, if life forms which are naturally present in the marine environment ingest the melanin material, they will be able to properly metabolize it, with little to no negative side effects, such that there is virtually no damage to the marine environment by the melanin material.

The methods for regulating the acid-base balance of the water and thereby reducing the acidification of water according to embodiments of the invention preferably require the presence of only the water and the melanin form. Specifically, since melanin absorbs photon energy from visible and invisible light, no additional application of energy is necessary to produce glucose and increase the pH of the water.

Thus, no complex setup or maintenance is required. However, it will be understood that a supplementary light source may be utilized if necessary. Further, since melanin is one of the most stable molecules known to man and has a half-life estimated to be on the order of millions of years, the melanin material can be used for decades before it needs to be replaced.

The invention will now be described with reference to the following experimental examples. It should be understood, however, that the invention is not limited to the precise experimental parameters and results shown below.

Experiment 1

Glucose was obtained from bicarbonate by placing a relatively small melanin form in a 1% to 10% bicarbonate aqueous solution. The melanin form was created by embedding melanin in a mixture of calcium and silica, avoiding the presence of hydroxyl ions, in a ratio of 70% by volume calcium and silica to 30% by volume of an aqueous solution of 3% melanin. Numerous such sample assemblies were prepared. After soaking the small melanin forms in the bicarbonate solution samples for approximately one hour, an increase of approximately 0.1 to 0.6 pH units was observed. However, it will be understood that the resulting increase in pH can be controlled by varying specific parameters, such as the size, shape and volume of the melanin form, and the pressure, temperature and initial glucose concentration of the water.

Experiment 2

In another experiment, 1 cubic centimeter melanin forms were made using inert elements, such as silicon, silica, calcium, and/or aluminum. The melanin forms contained 1% of melanin by volume and 99% of inert material by volume. Ten such melanin forms were placed in a bicarbonate aqueous solution prepared by mixing 100 g of bicarbonate in 1600 mL of water. After 48 hours, glucose levels were measured to be an average of 8 g of glucose per 100 mL of water.

Experiment 3

In another experiment, 1 cubic centimeter melanin forms of silica and calcium with a melanin material embedded therein were prepared as follows. A solution containing 3% by volume of melanin and two parts by volume of silica and calcium was prepared to form a solution containing 1% by volume of melanin and 99% by volume of inert material. The solution was then treated to enable evaporation of the water and subsequently solidified to create a melanin form. Nine such melanin forms were placed in a vessels each containing 250 mL of distilled water. Six vessels containing 250 mL of distilled water, but no melanin forms were also prepared as control samples. The pH of each water sample was measured periodically over a duration of 16 days, specifically every other day. Table 1 is a summary of pH measurements of the control samples. Table 2 is a summary of pH measurements of the distilled water samples with melanin forms contained therein, referred to herein as the experimental samples.

TABLE 1

| Control Sample | Day 1 | Day 3 | Day 5 | Day 8 | Day 10 | Day 12 | Day 14 | Day 16 |
| --- | --- | --- | --- | --- | --- | --- | --- | --- |
| 1 | 7.02 | 6.99 | 6.13 | 7.04 | 6.72 | 6.59 | 6.84 | 6.7 |
| 3 | 6.98 | 6.92 | 5.61 | 6.31 | 5.90 | 5.49 | 5.9 | 5.75 |
| 5 | 7.01 | 7.01 | 6.52 | 6.53 | 6.47 | 6.57 | 6.66 | 6.67 |
| 7 | 7.03 | 7.00 | 5.30 | 6.44 | 5.77 | 5.62 | 5.89 | 5.67 |
| 9 | 6.99 | 6.98 | 5.60 | 6.46 | 5.88 | 5.85 | 6.12 | 6.01 |
| 11 | 7.03 | 7.03 | 5.65 | 6.00 | 5.75 | 5.57 | 5.83 | 5.58 |
| Average | 7.01 | 6.99 | 5.80 | 6.46 | 6.08 | 5.95 | 6.21 | 6.06 |

TABLE 2

| Experimental Sample | Day 1 | Day 3 | Day 5 | Day 8 | Day 10 | Day 12 | Day 14 | Day 16 |
| --- | --- | --- | --- | --- | --- | --- | --- | --- |
| 2 | 11.59 | 11.62 | 12.12 | 12.20 | 12.21 | 12.30 | 12.29 | 12.19 |
| 4 | 11.60 | 11.54 | 12.18 | 12.23 | 12.20 | 12.36 | 12.34 | 12.31 |
| 6 | 11.62 | 11.76 | 12.18 | 12.23 | 12.24 | 12.32 | 12.30 | 12.30 |
| 8 | 11.72 | 11.70 | 12.14 | 12.25 | 12.25 | 12.36 | 12.32 | 12.22 |
| 10 | 11.86 | 11.84 | 12.16 | 12.23 | 12.24 | 12.33 | 12.33 | 12.30 |
| 12 | 11.58 | 11.52 | 12.16 | 12.24 | 12.23 | 12.32 | 12.27 | 12.29 |
| Average | 11.66 | 11.66 | 12.16 | 12.23 | 12.23 | 12.33 | 12.31 | 12.27 |

As shown in Table 2, the measured average pH of all of the experimental samples on day 1 was 11.66. As shown in Table 1, the measured average pH of all of the control samples on day 1 was 7.01. Accordingly, the relatively high average pH value of the experimental samples as compared with the control samples is clearly attributable to the melanin forms. Over time, the average pH of the experimental samples increased, peaking at 12.33 after 11 days. The average pH for the experimental samples at day 16 was 12.27. It is expected that the effect of melanin in bicarbonate aqueous solutions will last multiple years, in addition to not requiring energy. On the other hand, the average pH of the control samples tended to decrease over time, reaching a lowest average pH of 5.80 after 4 days and a final average pH of 6.06 on day 16.

In experiments performed with solutions that were not properly sterilized, the resulting glucose concentration was low, but nitrite concentration was increased. The resulting solutions maintained a remarkable transparency.

The amount of chemical energy released from reacting melanin with the $CO_2$-enriched water is generally within a relatively narrow range. It is an intrinsic property of melanin to regulate itself depending upon the amount of energy present in the surrounding environment. When a large amount of energy is in the environment, the energy emanating from the melanin will decrease. Conversely, if the amount of energy in the environment is low, the energy emanating from the melanin will increase. Since it is a natural chemical energy, it is conceivable that the effect of the chemical energy released on the ecosystem is not harmful or at least, the benefits outweigh the negative side effects.

Experiment 4

In another experiment, three groups, each having five vessels of distilled water, were prepared. In the first group, the vessels were left as is to serve as a control group. A fabric of synthetic fibers was placed in each vessel. The synthetic fiber fabric was 50% rayon and 50% polyester. Such fabric material is often found in water bodies as a source of pollution. In the second group, seven melanin forms wrapped in the same synthetic fiber fabric were placed in each vessel. In the third group, seven silica/calcium/aluminum forms (inert forms) containing no melanin material and wrapped in the same synthetic fiber fabric were placed in each vessel.

The vessels were then all closed (e.g., with a bakelite plug), a base pH was measure, and then all of the vessels were sterilized by the application of heat. Specifically, each vessel was heated for approximately 5 minutes, allowed to rest for a period of approximately 30 seconds, heated again for approximately 2 minutes, allowed to rest for a period of approximately 30 seconds, then subjected to 4 cycles of a 30-second heating period following by a 10-second rest period, and finally subjected to 4 cycles of a 10-second heating period following by a 10-second rest period. The vessels were then observed for a duration of three months, during which time the pH and oxygen saturation of each water sample was measured periodically, specifically every other day. Table 3 is a summary of pH measurements of the control samples. Table 4 is a summary of pH measurements of the distilled water samples with melanin forms contained therein, referred to herein as the experimental samples. Table 5 is a summary of pH measurements of the distilled water samples with inert forms (devoid of any melanin material) contained therein, referred to herein as the comparative samples.

TABLE 3

Control Samples

|   | Base pH | 2 days | 4 days | 7 days | 9 days | 11 days | 18 days | 30 days | 36 days | 45 days |
|---|---|---|---|---|---|---|---|---|---|---|
| 1 | 6.42 | 6.99 | 6.55 | 6.22 | 6.22 | 6.15 | 6.18 | 7.15 | 6.47 | 8.22 |
| 2 | 6.28 | 6.83 | 6.02 | 6.04 | 6.33 | 6.04 | 6.21 | 7.04 | 6.58 | 8.28 |
| 3 | 6.18 | 7.03 | 6.18 | 6.86 | 6.85 | 6.79 | 6.83 | 6.95 | 7.28 | 8.54 |
| 4 | 6.27 | 6.99 | 6.34 | 6.81 | 6.82 | 6.70 | 6.89 | 6.65 | 6.89 | 8.09 |
| 5 | 6.65 | 6.96 | 6.14 | 6.08 | 6.18 | 6.04 | 6.32 | 6.43 | 6.52 | 7.85 |
| Avg | 6.36 | 6.96 | 6.25 | 6.40 | 6.48 | 6.34 | 6.49 | 6.84 | 6.75 | 8.20 |

TABLE 4

Experimental Samples

|   | Base pH | 2 days | 4 days | 7 days | 9 days | 11 days | 18 days | 30 days | 36 days | 45 days |
|---|---|---|---|---|---|---|---|---|---|---|
| 1 | 11.60 | 12.36 | 12.50 | 12.54 | 12.54 | 12.63 | 12.66 | 12.60 | 12.50 | 12.63 |
| 2 | 11.68 | 12.25 | 12.49 | 12.62 | 12.61 | 12.63 | 12.66 | 12.61 | 12.50 | 12.62 |
| 3 | 11.61 | 12.32 | 12.50 | 12.51 | 12.56 | 12.61 | 12.64 | 12.56 | 12.50 | 12.61 |
| 4 | 11.58 | 12.41 | 12.49 | 12.52 | 12.54 | 12.62 | 12.67 | 12.54 | 12.50 | 12.60 |
| 5 | 11.66 | 12.31 | 12.49 | 12.57 | 12.58 | 12.61 | 12.62 | 12.54 | 12.47 | 12.55 |
| Avg | 11.63 | 12.33 | 12.49 | 12.55 | 12.57 | 12.62 | 12.65 | 12.57 | 12.49 | 12.60 |

TABLE 5

Comparative Samples

|   | Base pH | 2 days | 4 days | 7 days | 9 days | 11 days | 18 days | 30 days | 36 days | 45 days |
|---|---|---|---|---|---|---|---|---|---|---|
| 1 | 11.51 | 12.26 | 12.39 | 12.44 | 12.44 | 12.45 | 12.49 | 12.42 | 12.38 | 12.49 |
| 2 | 11.49 | 12.23 | 12.32 | 12.41 | 12.43 | 12.44 | 12.49 | 12.42 | 12.35 | 12.45 |
| 3 | 11.57 | 12.26 | 12.33 | 12.44 | 12.44 | 12.50 | 12.51 | 12.44 | 12.37 | 12.49 |
| 4 | 11.56 | 12.23 | 12.38 | 12.43 | 12.44 | 12.48 | 12.50 | 12.45 | 12.37 | 12.49 |
| 5 | 11.52 | 12.21 | 12.29 | 12.42 | 12.43 | 12.49 | 12.50 | 12.45 | 12.37 | 12.49 |
| Avg | 11.53 | 12.24 | 12.34 | 12.43 | 12.44 | 12.47 | 12.50 | 12.44 | 12.37 | 12.48 |

As shown in Tables 3-5, the measured average pH of all of the experimental samples was consistently greater than the measured average pH of all of the comparative samples, and consistently and significantly greater than all of the control samples. Accordingly, the relatively high average pH value of the experimental samples as compared with the control samples and comparative samples is clearly attributable to the presence of a melanin material. It was also found that melanin regulates itself by either increasing or reducing the pH according to the circumstances of the surrounding environment.

Figure 3:
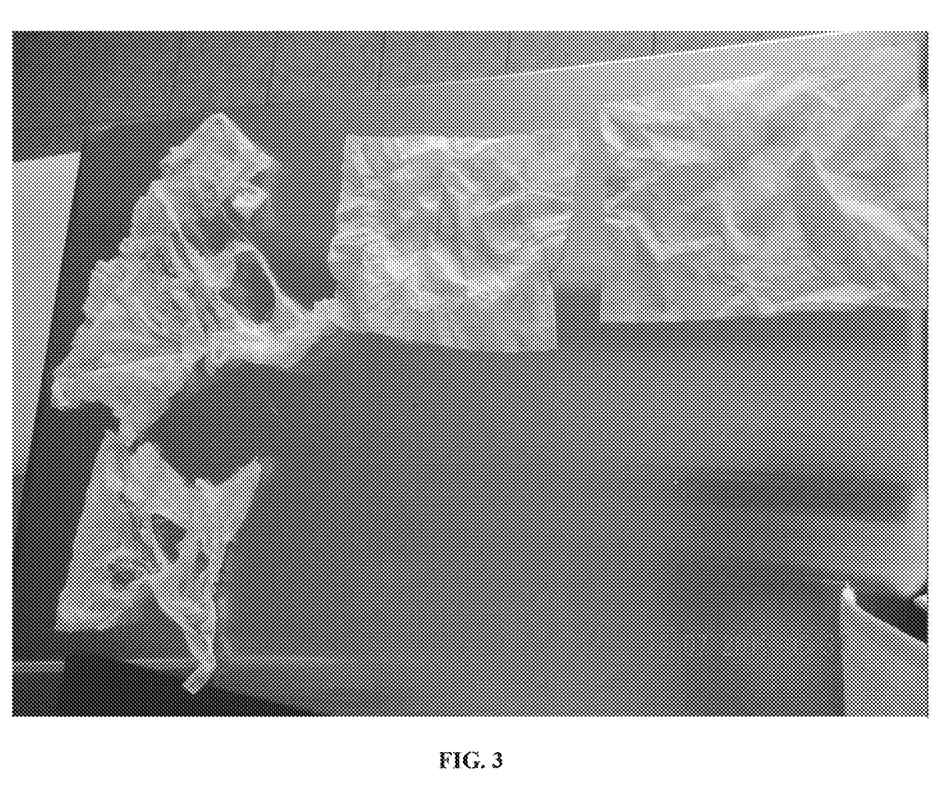
FIG. 3 is a photograph of different samples of a synthetic fiber fabric which has previously been immersed in water, demonstrating the effects of melanin and water on the fabric in accordance with another embodiment of the present invention.

Further, as clearly shown in FIG. 3, the synthetic fiber fabric of the control samples (Control Group; shown farthest right in the photograph), was still essentially intact even after being immersed in water for a duration of three months. The synthetic fiber fabric of the comparative samples provided with inert forms (Comparative Group; shown in the middle of the photograph) exhibited a minor breakdown of the fibers. In contrast, the synthetic fiber fabric of the experimental samples provided with melanin-containing forms (Experimental Group; shown farthest left in the photograph) exhibited a significant breakdown and degradation of the synthetic fibers. The degradation of the fibers is believed to have been caused by the growth of microorganisms, such as fungi, on the surface of the fabric due to the presence of the melanin material. That is, the melanin material promotes the growth of microorganisms which utilize the synthetic fibers as a source of carbon for growth. As such, it was found that the presence of melanin in water promotes aquatic life (e.g., microorganisms) which, in turn, facilitates the degradation of synthetic fibers which often pollute water bodies.

Experiment 5

In another experiment, three groups of vessels of distilled water were prepared. The first group of vessels included only melanin forms. The second group of vessels included melanin forms in the presence of bicarbonate ($HCO_3^-$). The third group of vessels included melanin forms in the presence of glucose ($C_6H_{12}O_6$). The vessels were then all closed and observed for a duration of time.

After eight (8) days, the first group of flasks revealed no visible changes in color. The water of the second group of flasks appeared to have a discrete yellow tone, while the water of the third group of flasks has a deeper yellow tone. A spectrophotometer was employed to measure the amount of light absorbed by each sample. The spectrophotometry exhibited a spectrum of absorption in the range of 180 nm to 300 nm for both the second and third groups, with less intense peaks observed in the second group, thereby indicating the presence of organic compounds in both the second and third groups of flasks.

After twenty two (22) days, the first group of flasks still revealed no visible changes in color. The water of the second group of flasks appeared to deepen in its yellow tone, while the water of the third group of flasks exhibited a milky appearance, thereby indicating the presence of amino acids and other organic compounds that may be synthesized from glucose. Spectrophotometry exhibited a spectrum of absorption in the range of 180 nm to 300 nm for the third group, with a peak at about 280 nm, which is compatible with the presence of tryptophan. The third group of flasks exhibited no bad odor.

The generation of edible organic compounds from $CO_2$ or glucose exponentially increases the capacity to produce food, and more particularly food which has not been polluted with pesticides and herbicides, which has been generated without the use of fertilizers, and which has been generated without the wasting of any water. The need for crops or killing animals for the generation of these edible complex organic molecules can therefore be significantly reduced, thereby notably reducing the pressure on non-renewable natural resources. In another aspect, such organic compounds can be dried and used as biofuels.

It will be appreciated by those skilled in the art that changes could be made to the embodiments and examples described above without departing from the broad inventive concept thereof. It is understood, therefore, that this invention is not limited to the particular embodiments disclosed, but it is intended to cover modifications within the spirit and scope of the invention as defined by the appended claims.

I claim:

1. A method for increasing a pH of water comprising at least one of dissolved $CO_2$, bicarbonate, and other carbonate derivatives, the method comprising:
   placing at least one melanin form into contact with the water, the at least one melanin form comprising eumelanin embedded within at least one inert material, the at least one inert material being a material which does not dissolve in water, the eumelanin catalyzing a reaction between the water and the at least one of dissolved $CO_2$, bicarbonate, and other carbonate derivatives which produces glucose and increasing the pH of the water.

2. The method according to claim 1, wherein the pH of the water is increased by 0.1 to 0.6 pH units after being contacted with the eumelanin.

3. The method according to claim 1, wherein the water is salt water.

4. The method according to claim 1, wherein the at least one inert material is selected from the group consisting of aluminum, silicon, silica, calcium, gold and silver.

5. The method according to claim 1, wherein the eumelanin is embedded in the at least one inert material by compression.

6. The method according to claim 1, wherein the eumelanin is embedded in the at least one inert material by adhesion.

7. A method for increasing a pH of water comprising at least one of dissolved $CO_2$, bicarbonate, and other carbonate derivatives, the method comprising:
   placing at least one melanin form into contact with the water, the at least one melanin form comprising eumelanin embedded within at least one inert material, the eumelanin catalyzing a reaction between the water and the at least one of dissolved $CO_2$, bicarbonate, and other carbonate derivatives which produces glucose and increasing the pH of the water,
   wherein the water includes synthetic fibers, wherein the eumelanin promotes growth of microorganisms, and wherein the microorganisms cause degradation of the synthetic fibers after a period of time.

8. The method according to claim 7, wherein the synthetic fibers are a mixture of 50% rayon and 50% polyester.

9. A method for regulating a pH of water, the method comprising:
   placing at least one melanin form into contact with the water, the at least one melanin form comprising eumelanin embedded within at least one inert material, the at least one inert material being a material that does not dissolve in water, wherein, if a starting pH of the water prior to contact with the at least one melanin form is less than 7.0, the presence of the eumelanin causes the starting pH to be increased; and wherein, if the starting pH of the water prior to contact with the at least one melanin form is greater than 7.0, the presence of the eumelanin causes the starting pH to be decreased.

10. The method according to claim 9, wherein the starting pH of the water is increased by 0.1 to 0.6 pH units after being contacted with the at least one melanin form.

11. The method according to claim 9, wherein the water is salt water.

12. The method according to claim 9, wherein the at least one inert material is selected from the group consisting of aluminum, silicon, silica, calcium, gold and silver.

13. The method according to claim 9, wherein the eumelanin is embedded in the at least one inert material by compression.

14. The method according to claim 9, wherein the eumelanin is embedded in the at least one inert material by adhesion.

15. The method according to claim 9, wherein the water comprises at least one of dissolved $CO_2$, bicarbonate, and other carbonate derivatives and wherein the eumelanin catalyzes a reaction between the water, $CO_2$, and carbonate derivatives, the carbon derivatives being selected from the group consisting of $H_2CO_3$, $HCO_3^-$, and $CO_3^{2-}$.

* * * * *